United States Patent
Matsunami et al.

(10) Patent No.: US 11,879,492 B2
(45) Date of Patent: Jan. 23, 2024

(54) NUT AND FIXING STRUCTURE OF NUT

(71) Applicant: AOYAMA SEISAKUSHO CO., LTD., Niwa-Gun (JP)

(72) Inventors: Shigeki Matsunami, Niwa-Gun (JP); Kazuhiro Koga, Niwa-Gun (JP); Tsuyoshi Kojima, Niwa-Gun (JP); Naoki Hoshino, Niwa-Gun (JP); Takuya Yoshida, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 528 days.

(21) Appl. No.: 16/951,264

(22) Filed: Nov. 18, 2020

(65) Prior Publication Data
US 2021/0115961 A1    Apr. 22, 2021

Related U.S. Application Data

(63) Continuation of application No. PCT/JP2019/023439, filed on Jun. 13, 2019.

(30) Foreign Application Priority Data

Jul. 27, 2018    (JP) .................. 2018-140812

(51) Int. Cl.
*F16B 37/06*    (2006.01)
*F16B 39/282*    (2006.01)

(52) U.S. Cl.
CPC .......... *F16B 37/068* (2013.01); *F16B 39/282* (2013.01)

(58) Field of Classification Search
CPC .................................... F16B 37/068
USPC .................................... 411/180, 188
See application file for complete search history.

(56) References Cited

U.S. PATENT DOCUMENTS

| 4,940,375 A | * | 7/1990 | Marvell ................ B23P 19/062 411/181 |
| 5,797,175 A | * | 8/1998 | Schneider ............. F16B 37/068 29/520 |
| 5,882,159 A | * | 3/1999 | Muller ................. B23P 19/062 411/179 |

(Continued)

FOREIGN PATENT DOCUMENTS

| DE | 20 2010 010 302 U1 | 11/2010 |
| JP | 2002-364622 A | 12/2002 |

(Continued)

OTHER PUBLICATIONS

Japanese Office Action (Application No. 2018-140812) dated Jun. 7, 2022 (with English translation).

(Continued)

*Primary Examiner* — Flemming Saether
(74) *Attorney, Agent, or Firm* — BURR PATENT LAW, PLLC

(57) ABSTRACT

To reduce the load required to press-fit a nut into a plate material, the nut includes a base part 2 provided with a female screw 18, a cylindrical protrusion part 3 protruding from one surface of the base part and a plurality of foot parts 4 protruding from an outer peripheral surface side of the protrusion part. An end of the respective foot parts closer to the protrusion part is formed so that a width gradually expands from a tip end side toward a protrusion part side, and that both outer sides of the end are arc-shaped in plan view.

2 Claims, 10 Drawing Sheets

(56) References Cited

U.S. PATENT DOCUMENTS

| | | | |
|---|---|---|---|
| 6,220,804 B1 | 4/2001 | Pamer et al. | |
| 6,817,815 B2* | 11/2004 | Ross | F16B 35/06 |
| | | | 411/188 |
| 6,851,904 B2 | 2/2005 | Parker et al. | |
| 7,112,024 B2* | 9/2006 | Ward | F01N 3/027 |
| | | | 411/188 |
| 8,434,985 B2* | 5/2013 | Babej | B21K 1/702 |
| | | | 411/180 |
| 8,979,455 B2* | 3/2015 | Burton | F16B 37/068 |
| | | | 411/166 |
| 9,400,005 B2* | 7/2016 | Osborn | F16B 19/00 |
| 10,655,666 B2* | 5/2020 | Hoshino | F16B 35/048 |
| 11,242,882 B2* | 2/2022 | Hoshino | F16B 35/048 |
| 2011/0211932 A1* | 9/2011 | Babej | F16B 39/282 |
| | | | 411/188 |
| 2012/0124812 A1 | 5/2012 | Shinjo | |
| 2014/0003883 A1 | 1/2014 | Osborn et al. | |
| 2020/0108475 A1* | 4/2020 | Schmidt | F16B 33/002 |

FOREIGN PATENT DOCUMENTS

| | | |
|---|---|---|
| JP | 2005-537448 A | 12/2005 |
| JP | 2012-112402 A | 6/2012 |
| JP | 2013-113396 A1 | 6/2013 |
| WO | 2004/020845 A1 | 3/2004 |

OTHER PUBLICATIONS

International Search Report and Written Opinion (Application No. PCT/JP2019/023439) dated Sep. 3, 2019.

\* cited by examiner

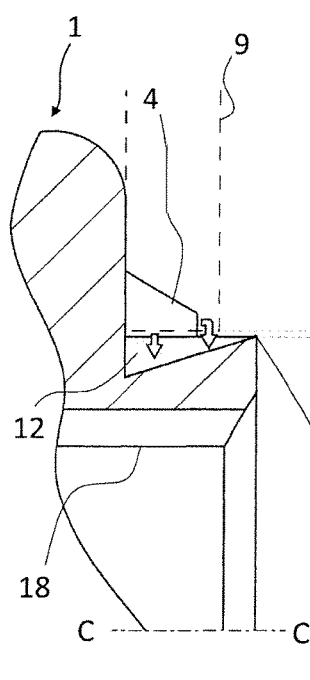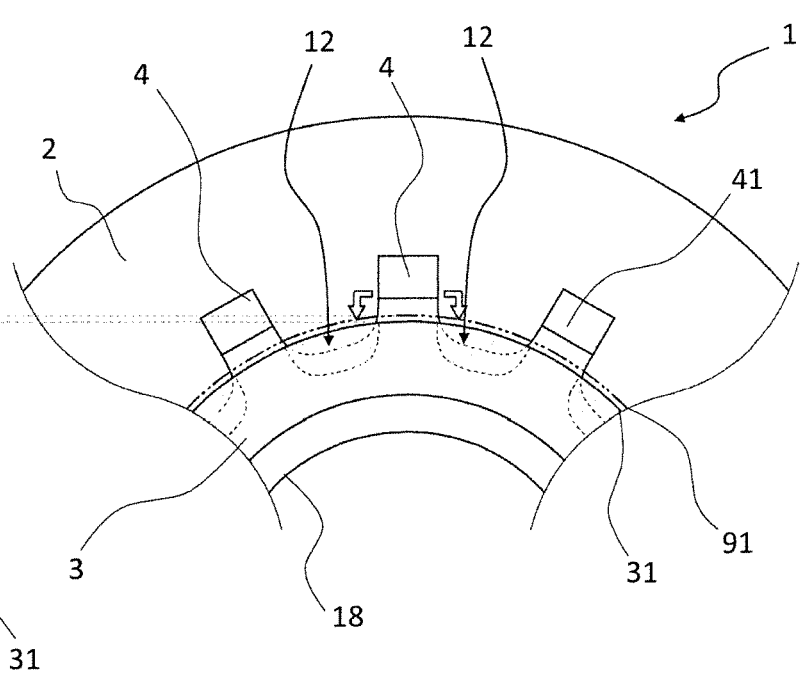
Fig. 6A
Fig. 6B

NUT AND FIXING STRUCTURE OF NUT

TECHNICAL FIELD

The present invention relates to a nut and a fixing structure of the nut.

BACKGROUND ART

As described in Patent Literature 1, it is known to use a nut fixed to a mating member. In this case, the nut is attached to the mating member by press-fitting and embedding. The nut is firmly embedded in the mating member because it is necessary to prevent the nut attached to the mating member from rotating or falling off.

CITATION LIST

Patent Literature

[PTL1] JP 2013-113396 A

Since the load required for press-fitting is large in conventional nuts, there has been a demand for reduction of the load. Successful reduction of the load required for press-fitting leads to suppression of the occurrence of unnecessary deformation in the mating member.

SUMMARY OF INVENTION

Technical Problem

The present inventor made intensive studies to solve this problem. An object of the present invention is to reduce the load required when press-fitting a nut into a mating member.

Solution to Problem

In order to solve the above-mentioned problem, the present invention provides a nut including: a base part provided with a female screw; a cylindrical protrusion part protruding from one surface of the base part; and a plurality of foot parts protruding from an outer peripheral surface side of the protrusion part, wherein an end of the respective foot parts closer to the protrusion part is formed so that a width gradually expands from a tip end side toward a protrusion part side, and that both outer sides of the end are arc-shaped in plan view.

Moreover, an outer periphery of the protrusion part is preferably formed so as to have a diameter smaller toward a base part side.

Further, the volume of a portion of the respective foot parts protruding outward beyond a largest outer peripheral portion of the protrusion part in plan view is preferably not more than a capacity of a storage space provided in a portion on an inner side of the largest outer peripheral portion of the protrusion part in plan view and between the adjacent foot parts in plan view.

Further, there is preferably provided a fixing structure of the nut wherein a mating member that is provided with a pilot hole larger than a largest outer periphery of the protrusion part of the nut is not deformed by the protrusion part, but deformed by the foot parts to fix the nut to the mating member.

Advantageous Effects of Invention

In the present invention, it is possible to reduce the load required when the nut is press-fitted into the plate material.

BRIEF DESCRIPTION OF DRAWINGS

FIG. 5A is a cross-sectional view as viewed from the side, and FIG. 5B is a plan view in which a two-dot chain line represents a pilot hole of the plate material, and broken lines shown on the inner side of the largest outer peripheral portion represent the shape of an end of a base part side of the foot part and the shape of the other end side of the foot part.

FIGS. 6A and 6B are views showing a colored storage space in the nut shown in FIG. 1. FIG. 6A is a cross-sectional view as viewed from the side, and FIG. 6B is a plan view in which a two-dot chain line represents a pilot hole of the plate material, and broken lines shown on the inner side of the largest outer peripheral portion represent the shape of an end of a base part side of the foot part and the shape of the other end side of the foot part. A white arrow represents an example of the direction in which a part of the plate material moves away.

DESCRIPTION OF EMBODIMENT

Figure 1:
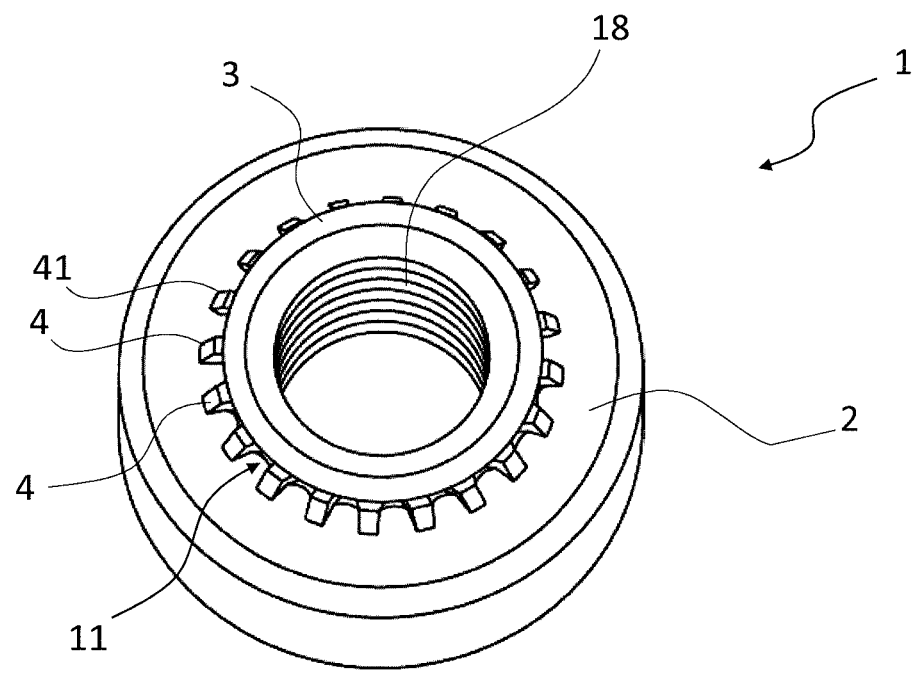
FIG. 1 is a perspective view of a nut as an example of an embodiment.
Figure 2:
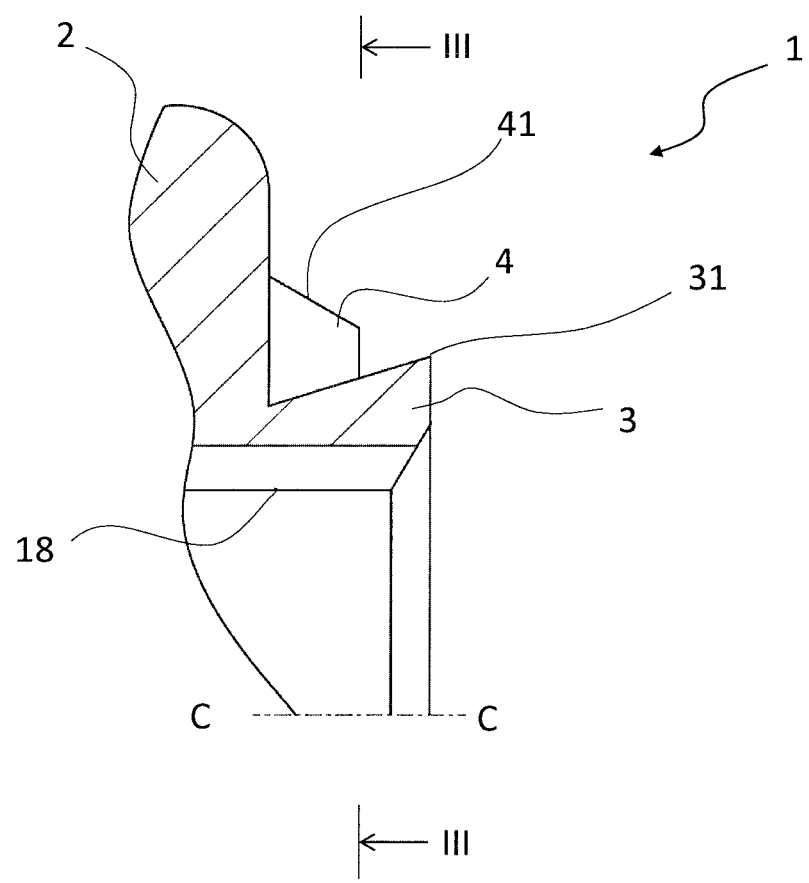
FIG. 2 is a cross-sectional view showing a part of a protrusion part side of the nut shown in FIG. 1.
Figure 3:
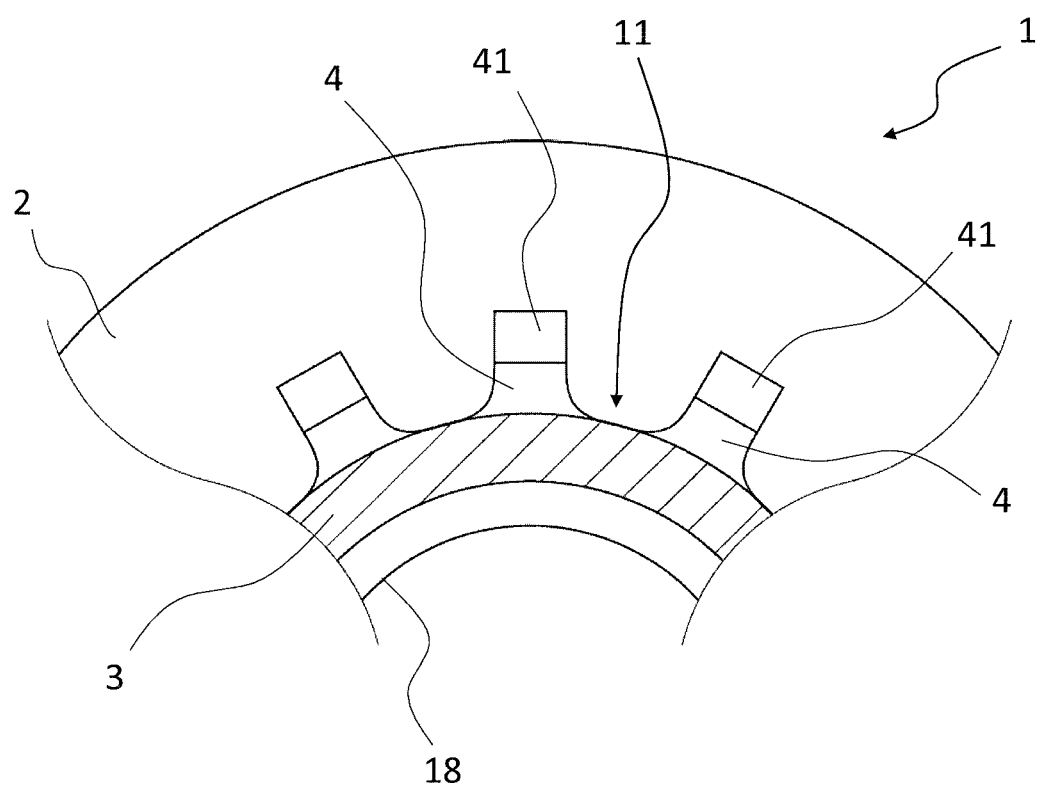
FIG. 3 is a view showing a part of the cross section shown in FIG. 2.

Hereinafter, an embodiment of the invention will be illustrated. An iron nut 1 for fastening will be described below as an example. As understood from what is shown in FIGS. 1 to 3, the nut 1 of the embodiment includes: a base part 2 provided with a female screw 18; a cylindrical protrusion part 3 protruding from one surface of the base part 2; and a plurality of foot parts 4 protruding from the outer peripheral surface side of the protrusion part 3. An end of the respective foot parts 4 closer to the protrusion part 3 is formed so that the width gradually expands from the tip end side toward the protrusion part 3 side, and that both outer sides of the end are arc-shaped in plan view. Therefore, a portion deformed by the foot part 4 is easily moved to a valley part 11 formed between the foot part 4 and the foot part 4, thereby making it possible to reduce the load required for press-fitting the nut 1 into the mating member.

The nut 1 of the embodiment includes the cylindrical base part 2 formed so that both end surfaces are substantially parallel, and the protrusion part 3 extending from one surface side of the base part 2. Further, the foot parts 4 are each provided to be continuous with the base part 2 and the protrusion part 3. The nut 1 of the embodiment is configured in such a manner that the central axis of the base part 2 and the central axis C of the protrusion part 3 coincide with each other. In the embodiment, in addition to the female screw 18 of the base part 2, a part of the protrusion part 3 is also provided with a female screw. This makes it possible to enlarge a portion to be brought in contact with a male screw while suppressing the thickness of the base part 2.

The foot parts 4 provided so as to be continuous with the protrusion part 3 are portions used to deform the mating member, and are also portions that suppress the rotation of the nut 1 with respect to a mating member. Therefore, the plurality of foot parts 4 are formed to extend outward from the outer peripheral surface of the protrusion part 3. The foot parts 4 of the embodiment are provided at equal intervals in the circumferential direction from the outer peripheral surface of the protrusion part 3, and are all configured to have the same shape.

Figure 4:
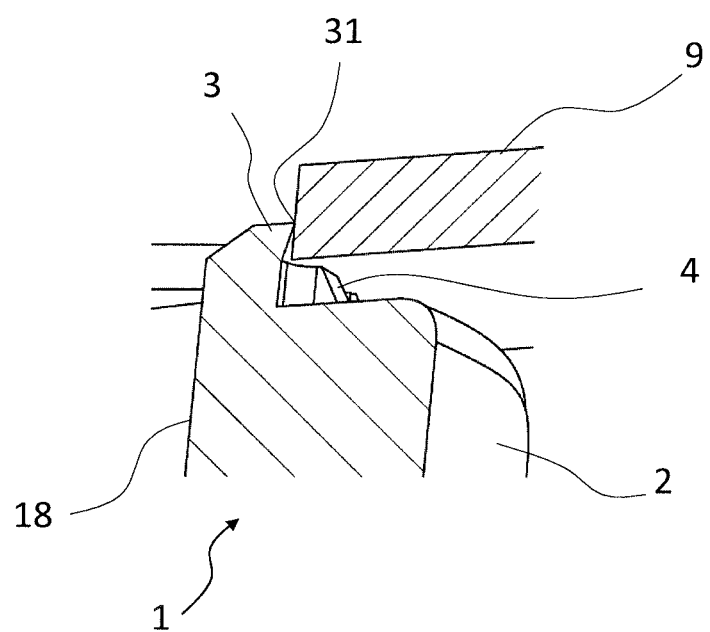
FIG. 4 is a view showing a state in which a plate material is mounted on a foot part of the nut.

In the embodiment, when the thus-formed nut 1 is attached to a plate material 9 as a mating member, the plate material 9 is brought into contact with the foot part 4, as shown in FIG. 4, and then pressurized. Then, a part of the relatively soft plate material 9 made of aluminum, stainless steel or the like is deformed. At this time, the part of the plate material 9 tries to move away from the force. By moving along the foot parts 4, the part of the plate material 9 easily moves to the valley part 11 formed between the foot part 4 and the foot part 4. In the embodiment, the valley part 11 having a substantially U shape in plan view is formed by the adjacent foot parts 4 and the outer peripheral surface of the protrusion part 3.

Moreover, the nut 1 of embodiment is formed so that the outer periphery of the protrusion part 3 may have a diameter which is smaller toward the side of the base part 2. When viewed from the side of the base part 2, the protrusion part 3 is formed to expand in diameter toward the open end. Therefore, even if the nut 1 tries to move in the axial direction so as to be away from the plate material 9 after movement of the plate material 9 to the side of the protrusion part 3, the portion moved to the valley part 11 abuts on the protrusion part 3 so that the movement of the nut 1 is suppressed. In the embodiment, the tip end portion of the protrusion part 3 of the nut 1 is a largest outer peripheral portion 31 having the largest outer peripheral diameter.

Figure 5A:
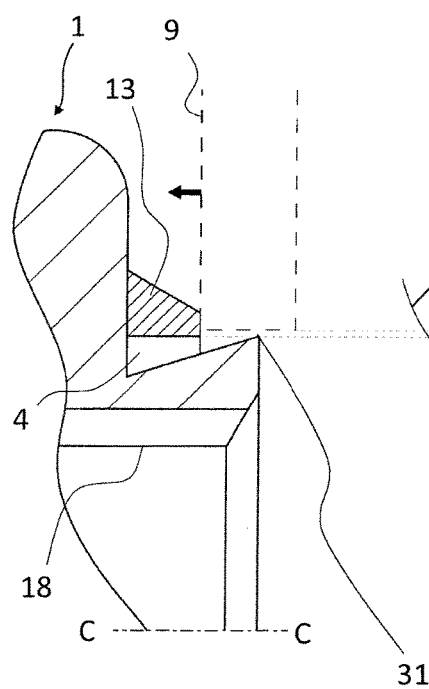
FIGS. 5A and 5B are views showing a pressurizable part of the nut shown in FIG. 1.
Figure 5B:
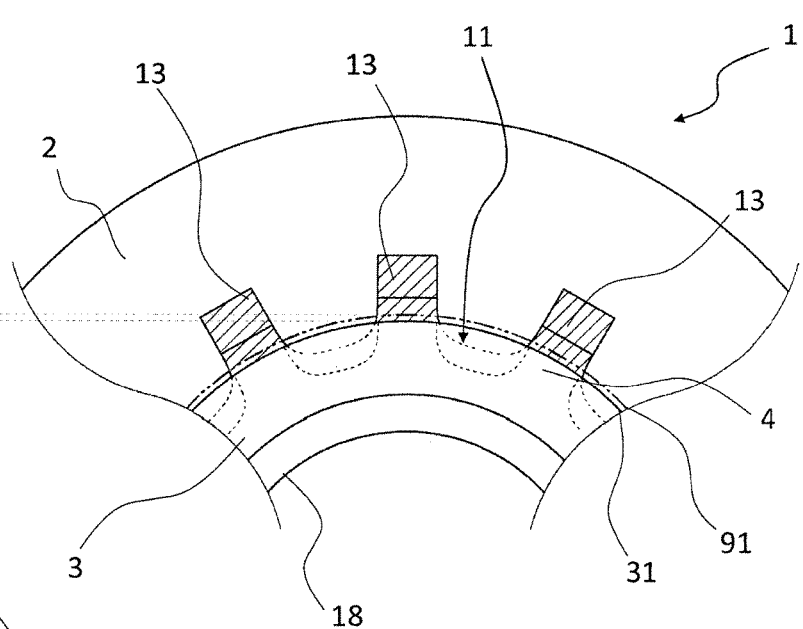

As can be understood from FIGS. 5A and 5B, the foot parts 4 of the embodiment are each provided with a pressurizable part 13 which is a portion protruding outward beyond the largest outer peripheral portion 31 of the protrusion part 3 in plan view. The plate material 9 is deformed using this portion. Therefore, the magnitude of inevitable deformation of the plate material 9 depends on the size of the pressurizable part 13. In FIGS. 5A and 5B, the pressurizable part 13 is a hatched portion of the respective foot parts 4.

As shown in FIGS. 6A and 6B, in the nut 1 of the embodiment, a storage space 12 is provided in a portion on the inner side of the largest outer peripheral portion 31 of the protrusion part 3 in plan view and between the adjacent foot parts 4 in plan view. However, the portion between the foot parts 4 in plan view, referred to herein, does not mean a portion located between the foot parts 4 in one cross section cut perpendicular to the axial direction. For a portion where the foot parts 4 exist in the cross section cut perpendicular to the axial direction, it means a region conceived to be between the adjacent foot parts 4. For a portion where no foot part 4 exists in the cross section cut perpendicular to the axial direction, it means a region conceived to be such that a portion of the respective foot parts 4 located at the position farthest from the base part 2 serves as a parting line.

The storage space 12 is a space in which the plate material 9 can flow when deformed. The storage space 12 of the embodiment continues from the base part 2 to the largest outer peripheral portion 31 in side view, and, in the example shown in FIGS. 6A and 6B, is a substantially triangular region in side view. In the nut 1 of the embodiment, the volume of a portion of the respective foot parts 4 protruding outward beyond the largest outer peripheral portion 31 of the protrusion part 3 in plan view is not more than the capacity of the storage space 12 provided in a portion on the inner side of the largest outer peripheral portion 31 of the protrusion part 3 in plan view and between the adjacent foot parts 4 in plan view. Therefore, an appropriate capacity of the storage space 12 can be secured.

In the embodiment, the same number of the storage spaces 12 as the foot parts 4 can be conceived. The storage space 12 is a space capable of storing a part of the deformed plate material 9, and at least a part of the space between the adjacent foot parts 4 forms a part of the storage space 12.

The tip end side of the respective foot parts 4 in the example shown in FIGS. 2 and 3 is formed to have a rectangular shape in plan view. The side surfaces of this rectangular portion are provided parallel to each other, so that the nut 1 can be made difficult to move relative to the mating member. Further, the tip end of the respective foot parts 4 is provided with an inclined surface 41 which is inclined so as to be more away from the central axis C toward the side of the base part 2. The inclusion of such an inclined surface 41 makes it possible to gradually increase the deformation area of the plate material 9 when fixing the nut 1 and the plate material 9, thereby improving the mold life.

Figure 7:
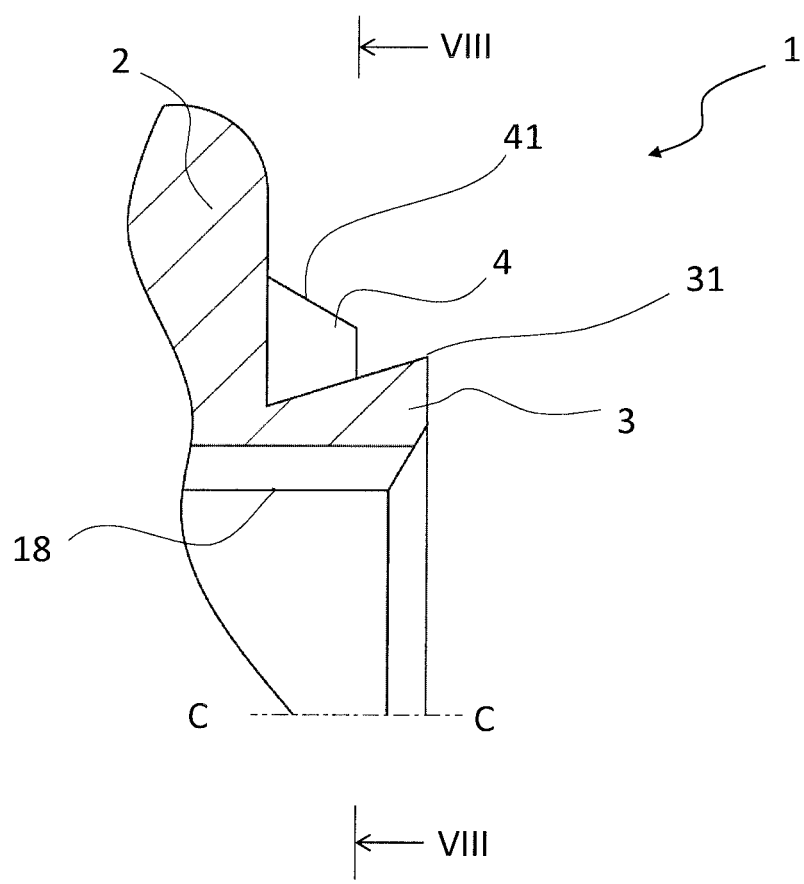
FIG. 7 is a cross-sectional view showing a part of the protrusion part side of a nut in which the tip end side of the foot part has an equal leg trapezoidal shape.
Figure 8:
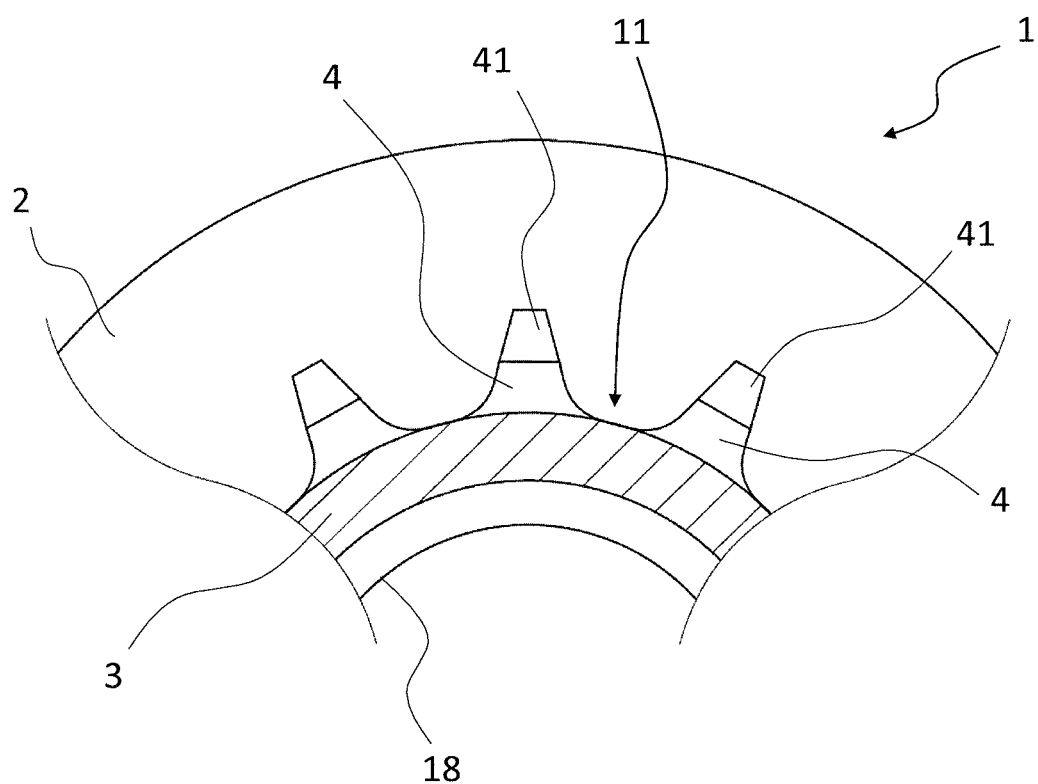
FIG. 8 is a view showing a part of the VIII-VIII cross section shown in FIG. 7.

The tip end side of the respective foot parts 4 in the example shown in FIGS. 7 and 8 is formed in an equal leg trapezoidal shape in plan view. Also in this example, the tip end of the respective foot parts 4 is provided with the inclined surface 41 which is inclined so as to be more away from the central axis C toward the side of the base part 2.

Figure 9:
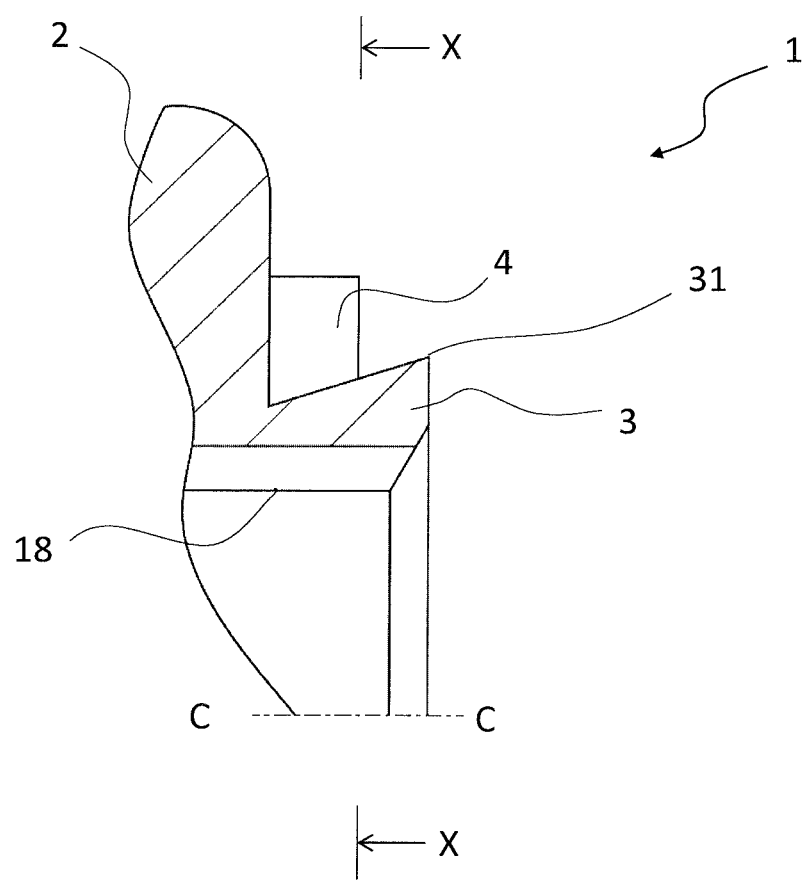
FIG. 9 is a cross-sectional view showing a part of the protrusion part side of a nut in which the tip end side of the foot part has a rectangular shape in side view.
Figure 10:
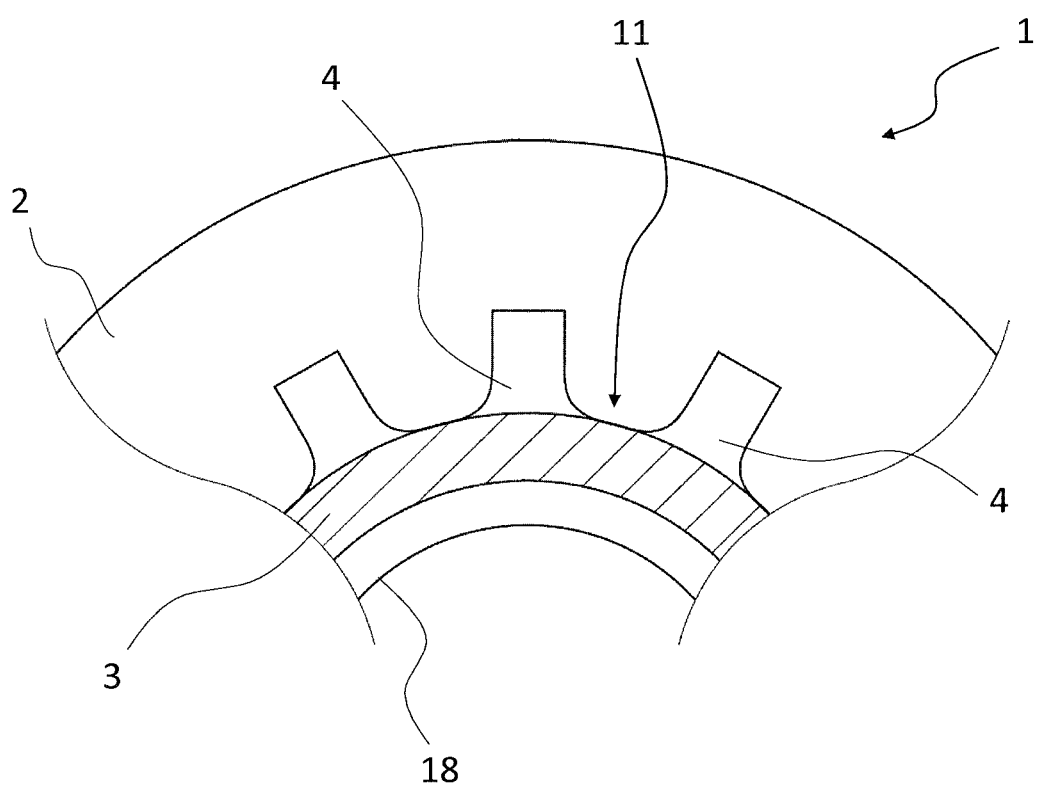
FIG. 10 is a view showing a part of the X-X cross section shown in FIG. 9.

The tip end side of the respective foot parts 4 of the example shown in FIGS. 9 and 10 is formed in a rectangular shape in plan view. The side surfaces of this rectangular portion are provided parallel to each other, so that the nut 1 can be made difficult to move relative to the mating member, as in the example shown in FIGS. 2 and 3. Moreover, the tip end of the respective foot parts 4 is formed in a rectangular shape also in side view. Such a tip end can improve the caulking strength.

In the fixing structure of the nut 1 of the embodiment, the plate material 9 is provided with a pilot hole 91 in which the protrusion part 3 can be inserted. The pilot hole 91 is configured to be larger than the largest outer periphery of the protrusion part 3. Therefore, the plate material 9 can be brought into contact with the foot parts 4 without being deformed by the protrusion part 3. The pilot hole 91 is provided in such a size that the plurality of radially-arranged foot parts 4 can come into contact with the plate material 9 in a state in which the protrusion part 3 is accommodated. When fixing the nut 1 and the plate material 9, it is only necessary to pressurize the plurality of foot parts 4 to press them against the plate material 9 so that the plate material 9 may be deformed by the foot parts 4. Therefore, since the plate material 9 and the nut 1 can be fixed by applying a force pressing the plate material 9 against the foot parts 4, the force necessary for fixation can be suppressed. In addition, when the plate material 9 receives the force, a part of the plate material 9 tries to move to the inside of the pilot hole 91, and a gap existing between the protrusion part 3 and the plate material 9 facilitates this movement.

Further, if the volume of a portion of the respective foot parts 4 protruding outward beyond the largest outer peripheral portion 31 of the protrusion part 3 in plan view is not more than the capacity of the storage space 12 provided in a portion on the inner side of the largest outer peripheral portion 31 of the protrusion part 3 in plan view and between the adjacent foot parts 4 in plan view, the space on the inner side of the pilot hole 91 is substantially larger than the volume of the pressurizable part 13 in consideration of the difference in size between the pilot hole 91 and the largest outer periphery of the protrusion part 3, whereby the inhibition of the movement of the plate material 9 is suppressed. As a result of this, the force required for fixing the nut 1 and the plate material 9 can be suppressed.

The present invention has been illustrated above using the embodiment, but is not limited to the embodiment described above, and various modes can be adopted. For example, the material for the nut does not have to be iron, and may be another material. However, the nut is preferably made of metal.

It is not necessary to provide a female screw on the protrusion part. In this case, only the base part can be screwed with the male screw.

Also, the base part need not have a cylindrical shape. For example, the base part may have a rectangular cylindrical shape or the like which is square or hexagonal in plan view.

The female screw provided on the base part may be not only a penetrating female screw, but also a non-penetrating female screw like a bag type nut.

REFERENCE SIGNS LIST

1 Nut
2 Base part
3 Protrusion part
4 Foot part
9 Plate material
11 Valley part
12 Storage space
13 Pressurizable part
18 Female screw
31 Largest outer peripheral portion
41 Inclined surface
91 Pilot hole

The invention claimed is:

1. A nut comprising:
a base part provided with a female screw;
a cylindrical non-piercing protrusion part protruding from one surface of the base part; and
a plurality of foot parts protruding from an outer peripheral surface side of the protrusion part,
wherein an end of the respective foot parts closer to the protrusion part is formed so that both outer sides of the end are arc-shaped in axial view and a volume of a portion of the respective foot parts protruding outward beyond a largest outer peripheral portion of the protrusion part in axial view is not more than a capacity of a storage space provided between the adjacent foot parts in axial view,
wherein the plurality of foot parts include a tip end side of a rectangular shape or a trapezoidal shape in axial view, and
wherein an outer periphery of the protrusion part is formed so as to have a diameter smaller toward a base part side.

2. A fixing structure comprising a nut and a mating member for fixing the nut,
wherein the nut comprises a base part provided with a female screw; a cylindrical non-piercing protrusion part protruding from one surface of the base part;
and a plurality of foot parts protruding from an outer peripheral surface side of the protrusion part,
wherein an end of the respective foot parts closer to the protrusion part is formed so that both outer sides of the end are arc-shaped in axial view and a volume of a portion of the respective foot parts protruding outward beyond a largest outer peripheral portion of the protrusion part in axial view is not more than a capacity of a storage space provided between the adjacent foot parts in axial view,
wherein the plurality of foot parts include a tip end side of a rectangular shape or a trapezoidal shape in axial view,
wherein the plurality of foot parts of the nut are adapted for deforming the mating member and fixing the nut to the mating member, and
wherein the mating member is provide d with a pilot hole larger than a largest outer periphery of the protrusion part of the nut and is not deformed by the protrusion part.

* * * * *